(12) United States Patent
Schaff et al.

(10) Patent No.: US 11,143,603 B2
(45) Date of Patent: Oct. 12, 2021

(54) DARK FIELD TENSOR TOMOGRAPHY METHOD, SPECIMEN HOLDER AND DEVICE

(71) Applicant: Technische Universität München, Munich (DE)

(72) Inventors: Florian Schaff, Murrumbeena (AU); Franz Pfeiffer, Unterföhring (DE)

(73) Assignee: TECHNISCHE UNIVERSITÄT MÜNCHEN, Munich (DE)

( * ) Notice: Subject to any disclaimer, the term of this patent is extended or adjusted under 35 U.S.C. 154(b) by 35 days.

(21) Appl. No.: 16/464,574

(22) PCT Filed: Nov. 28, 2017

(86) PCT No.: PCT/EP2017/080685
§ 371 (c)(1),
(2) Date: May 28, 2019

(87) PCT Pub. No.: WO2018/099914
PCT Pub. Date: Jun. 7, 2018

(65) Prior Publication Data
US 2019/0331616 A1     Oct. 31, 2019

(30) Foreign Application Priority Data

Nov. 30, 2016    (DE) ...................... 10 2016 223 797.7

(51) Int. Cl.
*G01N 23/046*      (2018.01)
*G01N 23/20025*    (2018.01)
*G01N 23/201*      (2018.01)

(52) U.S. Cl.
CPC ......... *G01N 23/046* (2013.01); *G01N 23/201* (2013.01); *G01N 23/20025* (2013.01); *G01N 2223/045* (2013.01); *G01N 2223/419* (2013.01)

(58) Field of Classification Search
CPC .... G01N 23/00; G01N 23/046; G01N 23/201; G01N 23/20025; G01N 23/20083;
(Continued)

(56) References Cited

PUBLICATIONS

Malecki et al. ("X-ray tensor tomography", Europhysics Letters: A Letters Journal Exploring the Frontiers of Physics, Institute of Physics Publishing, Bristol, FR, vol. 105, No. 3, Feb. 21, 2014 (Feb. 21, 2014), p. 38002, XP020256909, ISSN: 0295-5075). (Year: 2014).*

(Continued)

*Primary Examiner* — Jurie Yun
(74) *Attorney, Agent, or Firm* — Nelson Mullins Riley & Scarborough LLP; Kongsik Kim, Esq.

(57) ABSTRACT

The invention relates to an X-ray CT method and in particular a registration-based dark-field tensor tomography method for testing a sample (60) by means of X-rays, with which method a sample (60) is consecutively scanned by means of X-rays in at least two fixed orientations differing from one another while rotating about a fixed rotation axis, in every orientation of the sample (60) on the basis of dark-field signals a plurality of scatter data sets is recorded, and the scatter data sets for different orientations are matched to one another by registration and combined into a common scatter data set reflecting a possible angular dependence of the scatter present due to the sample (60).

5 Claims, 5 Drawing Sheets

(58) Field of Classification Search
CPC ....... G01N 2223/419; G01N 2223/045; G01N 2223/051; H01J 2237/2007; G21K 1/067
See application file for complete search history.

(56) References Cited

PUBLICATIONS

Revol, V. et al. (2014) "Laminate fibre structure characterization by orientation-selective X-ray grating interferometry", Proceedings of the Conference on Industrial Computed Tomography (iCT2014). Wels, Österreich 45-51 (7 pages).
Vogel, J. et al. (2015) "Constrained X-ray tensor tomography reconstruction", Optics Express. 23(12):15134-15151 (18 pages).
Schaff, F. et al. (2017) "Non-iterative Directional Dark-field Tomography", Scientific Reports. 7:3307 (9 pages).
"Goniometer", Wikipedia (2019). https://en.wikipedia.org/wiki/Goniometer (9 pages).
European Office Action, European Application No. 17811887.3, dated Sep. 14, 2020, 4 pages.
Malecki, A. et al., "X-ray tensor tomography," Europhysics Letters: A Letters Journal Exploring the Frontiers of Physics, Institute of Physics Publishing, vol. 105(3): 38002: 6 pages (2014).

* cited by examiner

DARK FIELD TENSOR TOMOGRAPHY METHOD, SPECIMEN HOLDER AND DEVICE

CROSS-REFERENCE TO RELATED APPLICATIONS

This application is a 35 U.S.C. 371 national stage filing of International Application No. PCT/EP2017/080685, filed on Nov. 28, 2017, which claims priority to and the benefit of German Patent Application No. 10 2016 223 797.7 filed on Nov. 30, 2016. The applications are incorporated herein by reference.

The invention relates to an X-ray CT method, a sample holder and an X-ray CT device. The present invention relates in particular to a registration-based dark-field tensor tomography method for testing a sample by means of X-rays, to a sample holder for an X-ray CT device and preferably for a registration-based dark-field tensor tomography device to mount a sample to be tested by means of an X-ray CT method, and to a registration-based dark-field tensor tomography device as such.

When testing objects as samples by means of X-rays, so-called X-ray CT methods are frequently used. To do so, the object to be tested is mounted as a sample in a sample holder and positioned between an X-ray source and a detector arrangement into a ray path forming the basis of the arrangement. The sample is exposed to X-rays from the X-ray source. While the sample is rotated, the radiation field behind the sample, i.e. after interaction of the radiation field with the sample material, is detected using the detector arrangement during irradiation of the sample.

The problem with conventional X-ray CT methods and devices is that particularly small structures in samples of any size cannot so far be resolved. This is partly due to the fact that a possible directional dependence during the recording of scatter data of the sample, for example in the form of dark-field signals, so far cannot be taken into account below the resolution capacity achieved when absorption data only is evaluated during the reconstruction of structures. Furthermore, possible shadowing of the radiation field due to a sample holder used, the lack of reference precision in the mountings of the sample in the sample holder if different orientations become necessary and the resultant extra effort for registration or for matching measured data to different sample orientations are undesirable.

The object underlying the present invention is to indicate an X-ray CT method, a sample holder and an X-ray CT device in which the radiation field necessary for testing is applied to a sample with a particularly high degree of reliability and at low expense and can be recorded with high precision in regard to mountings of the sample in different orientations, in order to obtain in this way information about structures that are below the resolution capacity of the analysis of X-ray absorption data only.

This object is solved by an X-ray CT method in accordance with the invention having the features described herein, by a sample holder in accordance with the invention having the features described herein as well as by an X-ray CT device in accordance with the invention having the features described herein. Advantageous developments become apparent in each case from the present disclosure.

According to a first aspect of the present invention, an X-ray CT method and in particular a registration-based dark-field tensor tomography method is provided for testing a sample by means of X-rays, with which method a sample is consecutively scanned by means of X-rays in at least two fixed orientations differing from one another while rotating about a fixed rotation axis, in every orientation of the sample on the basis of dark-field signals a plurality of scatter data sets is recorded, and the scatter data sets for different orientations are matched to one another by registration and combined into a common scatter data set reflecting a possible angular dependence of the scatter present due to the sample.

It is therefore a key aspect of the present invention to match, by multiple, i.e. at least twofold, scanning of a given sample during rotation in differing but fixed rotation axes by means of X-rays and while recording and evaluating scatter signals, in particular according to the dark-field principle, the thus recorded scatter data sets in differing orientations of the rotation axis and hence of the sample to one another by registration, and thereby to provide a single and common scatter data set which also reflects the directional dependence of the scatter properties of the sample.

In this way it is for the first time possible to record and evaluate in a profitable manner the directional dependence of the scatter properties that characterizes the sample.

A scatter data set for the thus defined orientation of the sample is here selectively recorded for a respective orientation of the rotation axis using the dark-field signals. The scatter data sets for different orientations are combined by registering them with one another, i.e. by matching them to a common scatter data set. The latter then reflects the directional dependence of the scatter properties of the sample and supplies a resolution of structures below the resolution capacity that can be achieved when analyzing absorption data only.

In an advantageous development of the method in accordance with the invention, a respective orientation of the sample is defined by an orientation of a fixed rotation axis of the sample, about which the sample is rotated during scanning by means of X-rays.

In another configuration of the method in accordance with the invention, the sample is scanned for at least three different orientations of the rotation axis in order to generate scatter data sets, with these three orientations of the rotation axis being in particular perpendicular or substantially perpendicular to one another in pairs, in particular enclosing an angle of at least 70°, preferably of at least 80°, more preferably of at least 85°. Ideally, when three orientations are used for the rotation axis they should be perpendicular to one another in pairs.

The method in accordance with the invention is particularly advantageous when, in accordance with another development for generating scatter data sets, the sample is scanned for four different orientations of the rotation axis. In this case, the angle enclosed between two orientations can be dimensioned more generously, i.e. a strictly perpendicular alignment to one another is not essential.

The method in accordance with the invention is particularly advantageous in interaction with a structure forming the basis for an X-ray CT device, where a respective rotation axis is aligned perpendicular or substantially perpendicular in an orientation of the sample to identically oriented first, second and third grating elements of a grating arrangement between a radiation source and a detector arrangement in the ray path of a used grating-based interferometer arrangement of the X-ray CT device forming the basis.

Particularly favourable conditions are achieved in another embodiment of the method in accordance with the invention when, for mounting the sample and for setting the orientation, in particular of a respective rotation axis, a sample holder is used which has a sample holder body designed to receive the sample in its interior indirectly or directly on an inner side of the sample holder hollow body, in particular detachably, and connected or connectable non-rotatably to the sample holder body.

According to a further aspect, the present invention thus also provides a sample holder for an X-ray CT device and in particular for a registration-based dark-field tensor tomography device for mounting a sample to be tested by means of an X-ray CT method. The sample holder in accordance with the invention has a sample holder body designed to receive a respective sample in its interior indirectly or directly on an inner side of the sample holder hollow body, in particular detachably, and connected or connectable non-rotatably to the sample holder body. By these measures it is possible, in connection with an X-ray CT device, in particular a registration-based dark-field tensor tomography device, and with the imaging methods to be implemented here, to rotate a sample to be tested, arranged in different orientations in the irradiated radiation field, with high reliability and with simple means and to scan it during rotation by means of X-rays. This procedure is of particular advantage, especially in connection with the evaluation techniques of registration-based dark-field tensor tomography.

Generally speaking, the sample holder body can have any shape permitting a well-defined and oriented mounting in its interior of a sample to be tested. Special material and/or geometrical configurations are of particular advantage here in respect of the simplest possible handling capability and/or the necessary degree of mechanical stability.

It is thus provided according to a preferred development of the sample holder in accordance with the invention that the sample holder body is designed partially or completely as a hollow body, in particular with edge elements and/or surface elements forming the sample holder body. The design as a hollow body offers the possibility of a particularly dependable fastening and/or orientation of a sample to be tested.

Alternatively or additionally, the sample holder body can, according to another configuration of the sample holder in accordance with the invention, be designed partially or completely as a frame structure, in particular with edge elements forming the sample holder body.

In its simplest form, a frame structure of this type can be formed by a simple—in particular planar—frame, for example in the shape of a square, rectangle or polygon or a circular or ellipsoid ring.

Due to the geometrical conditions in connection with the radiation field used, uniform designs for the sample holder body offer particular advantages.

It is thus provided according to another development of the sample holder in accordance with the invention that the sample holder body has a shape from the group of shapes formed by the shape of a hollow sphere, a hollow ellipsoid, an Archimedean solid and in particular a cube, cuboid, icosahedron or cuboctahedron.

A hollow body with an at least substantially closed surface can be provided here as the respective basic shape of a sample holder body.

Alternatively or additionally, the sample holder body and in particular its hollow body can however also be designed in the manner of an edge, frame or grating model, i.e. with purely material edges and open surfaces.

To permit in a simple manner a well-defined and fixed orientation of a sample to be tested inside the sample holder hollow body, it is provided in another additional or alternative configuration of the sample holder in accordance with the invention that the sample holder body has a fastening arrangement, preferably in its interior, for—in particular detachable—fastening of a sample to be tested on an inner side of the sample holder hollow body, preferably with one or more fastening means, e.g. in the form of thread or rod structures and/or of adhesive points.

Since the sample holder body and in particular the edge elements and/or surface elements forming it are made from a certain material, the appropriate material constituents will have a more or less strong influence on the incoming radiation field and also on the radiation field outgoing after interaction with the sample.

In view of this problem, it is of particular advantage if, according to another embodiment of the sample holder in accordance with the invention, a respective edge element and/or a respective surface element is formed from a material which has uniform optical properties for X-rays to be used and in particular is uniformly transparent.

It is also of advantage when the sample holder in accordance with the invention is designed directly with a rotation device, namely with a drivable rotary axis or rotary shaft—in particular controllable—on which or to which the sample holder body is coupled or couplable non-rotatably.

The present invention furthermore provides an X-ray CT device, in particular in the form of a registration-based dark-field tensor tomography device, which is equipped for testing a sample by means of an X-ray CT method, in particular by means of a registration-based dark-field tensor tomography method and/or according to the method in accordance with the invention and presented above.

The X-ray CT device has a sample holder designed in accordance with the invention for mounting a sample to be tested.

In an advantageous development of the X-ray CT device in accordance with the invention, the device is designed as a grating-based interferometer arrangement and with a controllable radiation source for generating and emitting primary X-rays and with a detector arrangement at a spatial distance from the radiation source for detection of X-rays emitted by the radiation source via a ray path. A grating arrangement with first, second and third grating elements aligned to one another in the ray path is provided here between the radiation source and the detector arrangement. Furthermore, the sample holder in accordance with the invention is arranged in the ray path between a first grating element on the radiation source side and a second grating element on the detector side.

According to a further aspect of the present invention, an X-ray CT method and in particular a registration-based dark-field tensor tomography method for testing a sample by means of X-rays is also provided, in which method a sample holder designed in accordance with the invention and an X-ray CT device designed in accordance with the invention are used.

Further details, advantages and characteristics of the present invention become apparent from the following description of exemplary embodiments in light of the drawing.

In the following, exemplary embodiments of the invention and the technical background are described in detail with reference to FIGS. 1 to 11. Identical and equivalent as well as identically or equivalently effective elements and components are identified with the same reference numerals. The detailed description of the elements and components referred to is not reproduced in every instance that they occur.

The features and further properties shown can be isolated from one another in any form and combined with one another in any way without abandoning the core of the invention.

Figure 1:
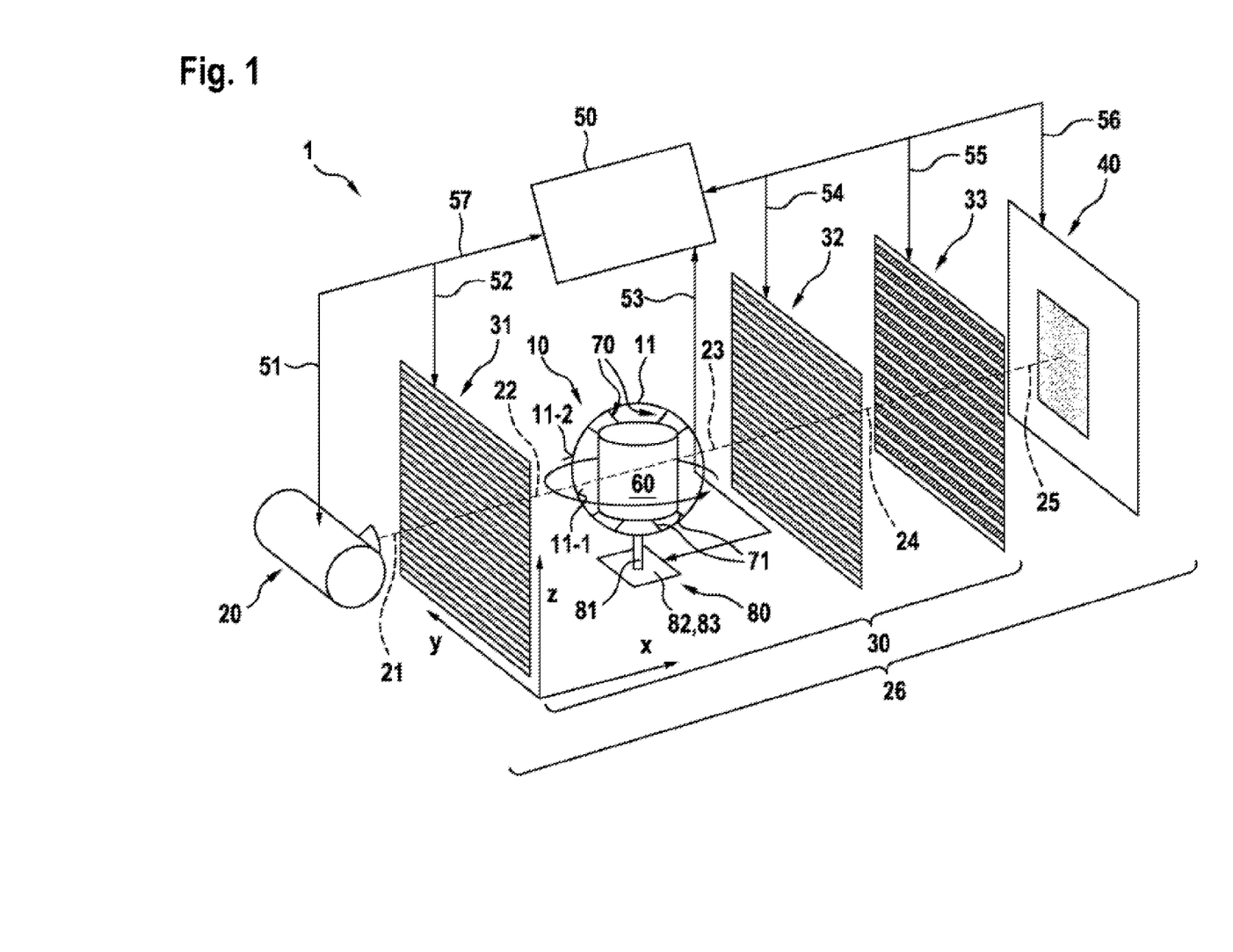
FIG. 1 shows in a perspective side view an embodiment of the X-ray CT device in accordance with the invention using an embodiment of the sample holder in accordance with the invention.

FIG. 1 shows in a perspective side view an embodiment of the X-ray CT device 1 in accordance with the invention using an embodiment of the sample holder 10 in accordance with the invention.

The X-ray CT device 1 in accordance with the invention has an X-ray source as a radiation source 20, a detector arrangement 40 arranged in the ray path 26 of the device 1 and opposite the radiation source 20, and a grating arrangement 30 in the ray path 26 between the radiation source 20 and the detector arrangement 40 with a first grating element 31, a second grating element 32 and a third grating element 33.

The grating elements 31, 32, 33 of the grating arrangement 30 are arranged evenly, parallel to one another and with their grating lines also parallel to one another in the ray path 26.

Specifically, this means in FIG. 1 that the ray path 26 extends parallel to the x-direction, that all grating elements 31, 32, 33 with their grating planes are oriented parallel to the yz-plane and that the grating lines of the grating elements 31, 32, 33 are also aligned parallel to one another and in FIG. 1 parallel to the y-direction.

An embodiment of the sample holder 10 in accordance with the invention is arranged between the first grating element 31 which is positioned on the radiation source side and a second grating element 32 which is positioned on the detector side. Alternatively, an arrangement of the sample holder 10 between the second grating element 32 and the third grating element 33 is possible.

The sample holder 10 in accordance with the invention consists of a sample holder body 11, also referred to as a sample holder hollow body due to its nature. In the exemplary embodiment of FIG. 1, the sample holder body 11 consists of a hollow sphere with an inner side or inner face 11-1 and an outer side or outer face 11-2. An object, in this case in the form of a cylinder, is attached as a sample 60 on the inner side 11-1 of the hollow sphere as the sample holder body 11 using fastening means 71 of a fastening device 70, so that the sample 60 is connected non-rotatably to the sample holder body 11.

Besides the sample holder body 11, the sample holder 10 has a rotation device 80 for rotation of the sample holder body 11 with the sample 60 mounted therein in a certain orientation about a rotary axis 81, also referred to as the rotation axis.

In the embodiment according to FIG. 1, the rotary or rotation axis 81 of the sample holder 10 is attached to a base 82 with a drive device 83 for controlled rotation of the rotation axis 81. The sample holder 10 is connected with its rotation device 80 to a control unit 50 via a control and recording line 53. By these measures, the position and/or the orientation of the sample holder 10 and hence of the sample 60 mounted therein can be recorded relative to the ray path 26 of the X-ray CT device 1 and adjusted by actuation of the rotation device 80.

The position and/or operation of the radiation source 20, of the grating elements 31, 32, 33 of the grating arrangement 30 and of the detector arrangement 40 can be recorded and/or influenced in controlled manner via further control and recording lines 51, 52, 54, 55 and 56.

The illustration according to FIG. 1 already makes clear that within the framework of an X-ray CT method, in particular in the form of a registration-based dark-field tensor tomography method, the use of the sample holder 11 in accordance with the invention provides advantages in that
(A) by a corresponding selection of the fastening in the interior 12 of the sample holder hollow body 11, i.e. using the fastening means 71 on the inner side 11-1 of the sample holder hollow body 11, the sample 60 can be scanned in the ray path 26 in a plurality of well-defined orientations relative to the sample holder body 11 by a corresponding operation and movement of the rotary axis 81 during rotation in the radiation field, wherein
(B) on the one hand a particularly reliable mutual registration and/or alignment of the individually recorded image data sets is possible with particularly simple means, and
(C) on the other hand a particularly minor influence of the radiation field during irradiation of the sample 60 and when leaving the sample 60 after interaction is achieved by the design and shape of the sample holder body 11 and by the nature of the mounting of the sample 60 in the interior 12 of the sample holder hollow body 11.

Figure 2:
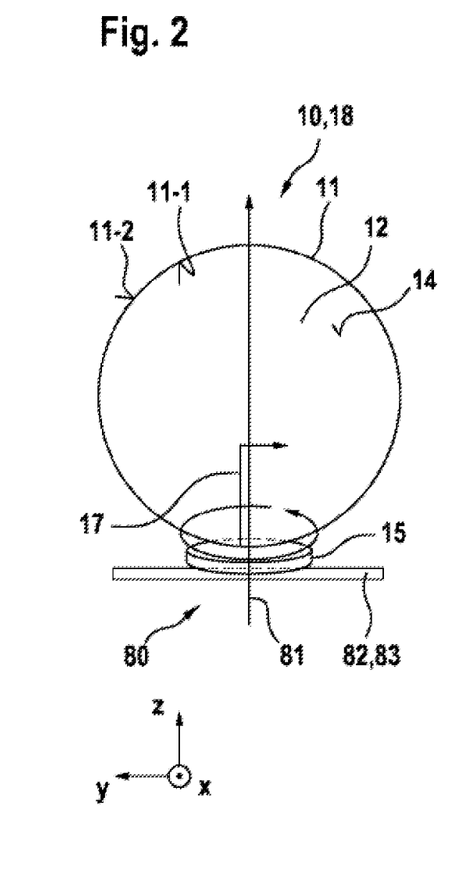
FIGS. 2 to 4 show in a schematic side view an embodiment of the sample holder in accordance with the invention with a sample holder body in the form of a hollow sphere in different orientations.
Figure 3:
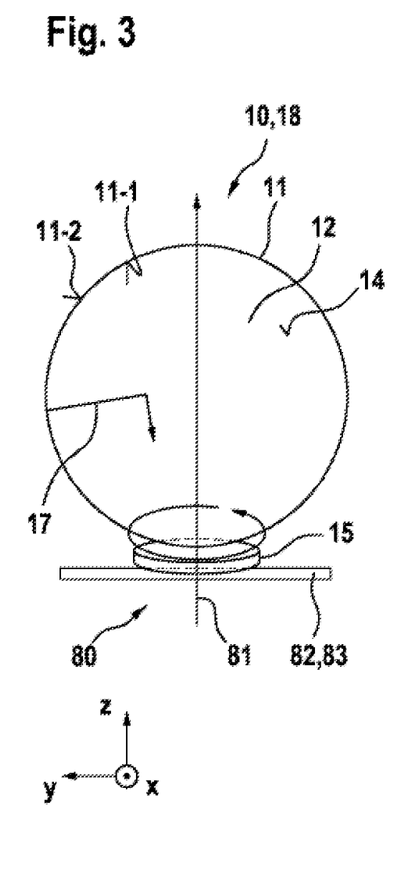
Figure 4:
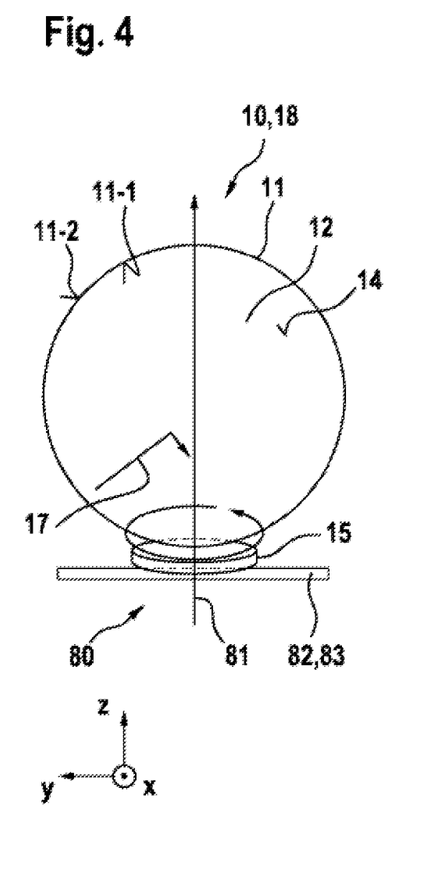

FIGS. 2 to 4 show another embodiment of the sample holder 10 in accordance with the invention in different orientations.

The sample holder 10 shown there consists in turn of a sample holder body 11 in the form of a hollow sphere with an outer side 11-2 and an inner side 11-1. Furthermore, this sample holder 10 in accordance with the invention has a rotation device 80 with a rotation axis 81 and a drive 83 in or on a base 82.

The rotation axis 81 is oriented parallel to the z-direction. The base 82 is substantially in the xy-plane.

The different orientations of the sample holder hollow body 11 inside the space are discernable from the orientation mark 17 provided on the surface of the sample holder hollow body 11. With the respectively specified orientation of the mark 17, which can for example correspond to an orientation of a sample 60 to be mounted in the interior 12 of the sample holder body 11, a rotation about the rotary axis 81 can take place, e.g. by controlled drive by the drive device 83.

Figure 5:
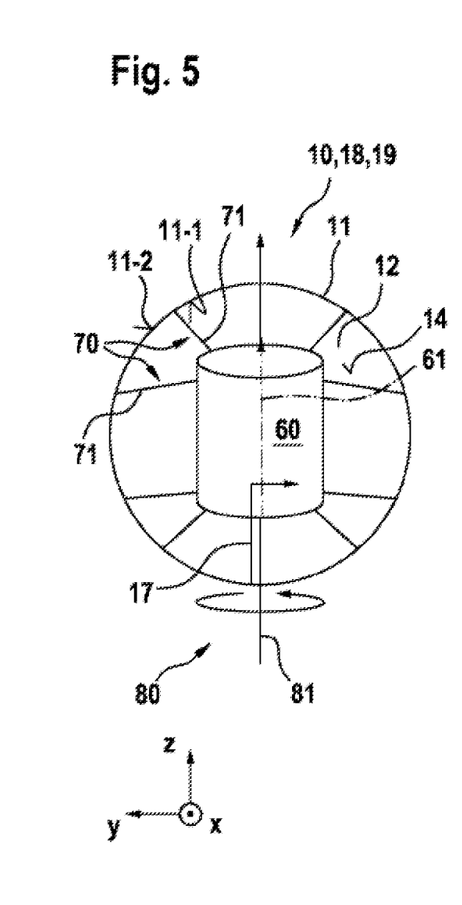
FIGS. 5 to 7 show in a schematic side view another embodiment of the sample holder in accordance with the invention with a sample in cylindrical form arranged in different orientations in the sample holder body.
Figure 6:
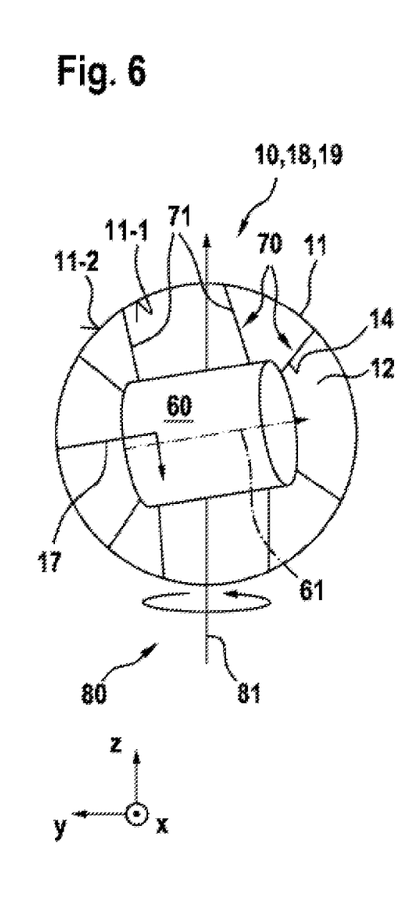
Figure 7:
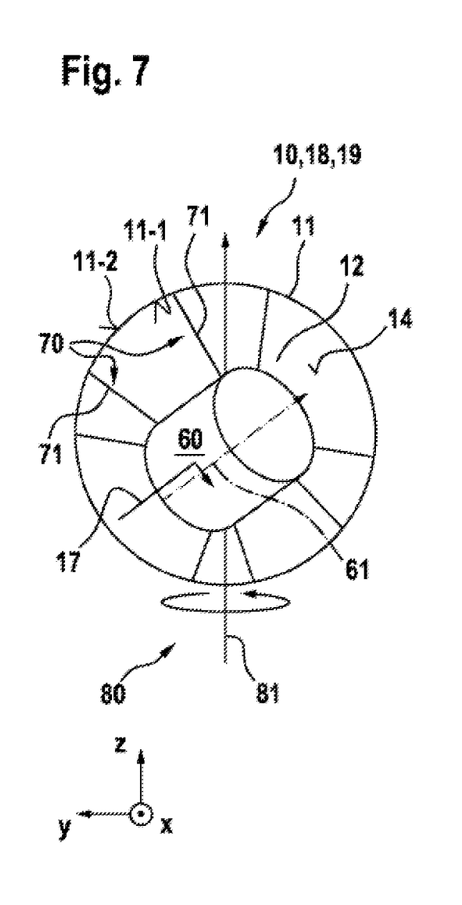
Figure 8:
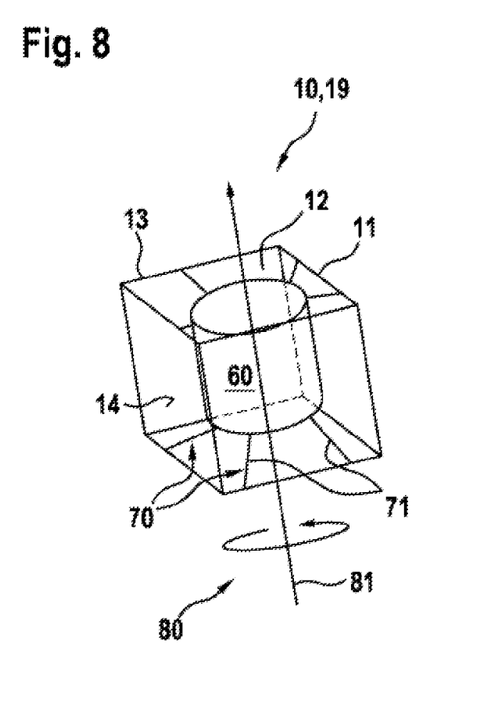
FIGS. 8 to 10 show in a schematic side view other embodiments of the sample holder in accordance with the invention with a sample in cylindrical form arranged in the sample holder body in each case.
Figure 9:
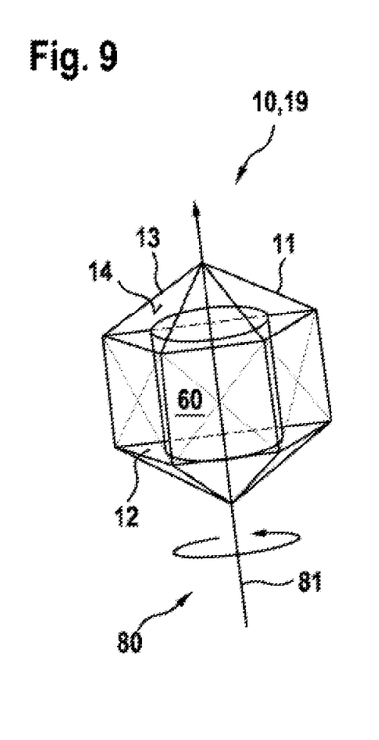
Figure 10:
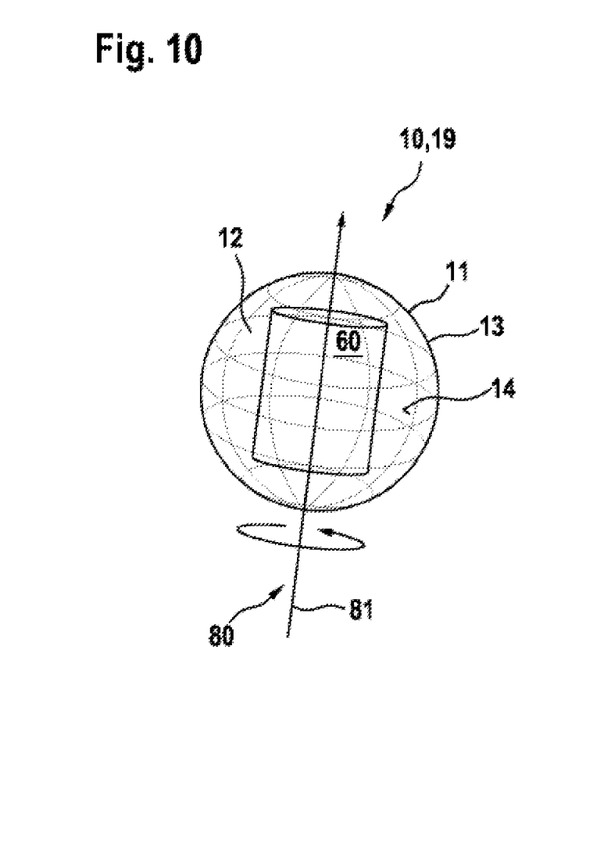
Figure 11:
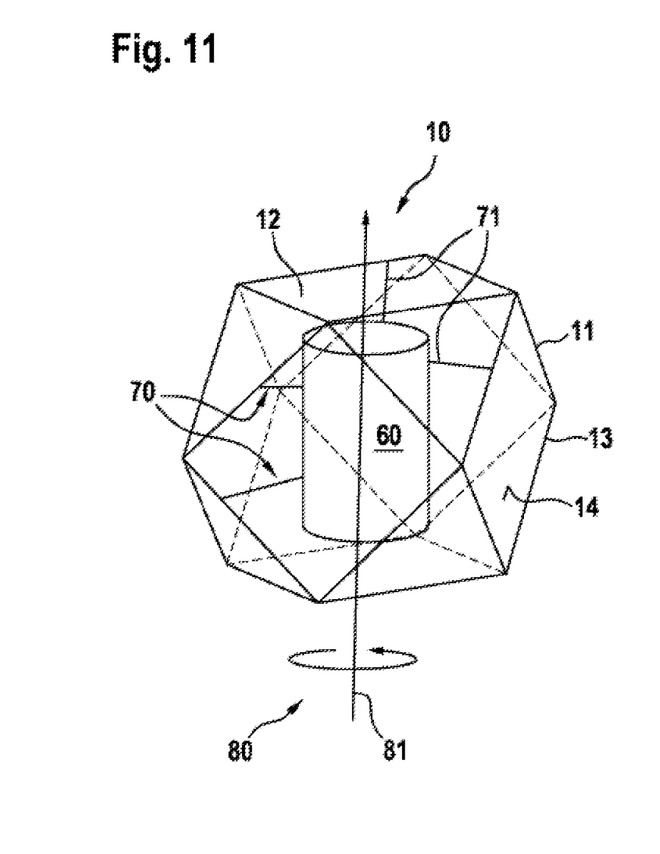
FIG. 11 shows in a perspective side view an embodiment of the sample holder in accordance with the invention in the form of a cuboctahedron with a sample in cylindrical form arranged therein.

FIGS. 5 to 7 show another embodiment of the sample holder 10 in accordance with the invention.

An object in cylindrical form is here attached as the sample 60 in the interior 12 of the sample holder body 11 and fastened using fastening means 71 of a fastening arrangement 70 on the inner side 11-1 of the sample holder body 11.

FIGS. 5 to 7 show here using the orientation marks 17 the orientation of the sample 60 with its symmetrical axis 61 relative to the outer reference system of the device 1 created by the alignment of the trihedron of xyz.

According to the illustrations in FIGS. 5 to 7, the sample holder body 11 can again be a hollow body 18 in hollow sphere form.

Alternatively, the sample holder body 11 shown in FIGS. 5 to 7 can also be regarded as a frame structure 19, for example in the form of an annular or circular frame.

FIGS. 8 to 11 show other embodiments of the sample holder 10 in accordance with the invention that differ in respect of the design of the sample holder bodies 11.

The sample holder bodies 11 of the embodiments in FIGS. 8 to 11 are formed by a cube, an icosahedron, an approximate shape of a sphere or a cuboctahedron.

All models can be regarded as hollow bodies 18 with edge elements 13 and surface elements 14 or as a pure frame structure 19, formed exclusively by edge elements 13. Mixed forms are conceivable.

Besides the foregoing written description of the invention, explicit reference is made here to the drawing illustration of the invention in FIGS. 1 to 11 for additional disclosure.

The present invention preferably relates to the so-called registration-based dark-field tensor tomography as a method and to a device 1 equipped for implementation of such a method and which can in particular also be regarded as an X-ray CT system 1.

The focus is in particular on a method for orientation-sensitive X-ray dark-field tomography, which is also referred to as X-ray tensor tomography (XTT). As regards the devices for such methods, a so-called horizontal grating interferometer is used, which in accordance with the invention is designed with a new concept of a sample holder 10.

One main advantage of the procedure in accordance with the invention is that data recording and subsequent processing can be performed using well established methods. By restricting the recorded dark-field scatter signal in view of an orientation parallel to the rotation axes forming the basis, multiple dark-field CT scans can be combined with one another to characterize the voxel-wise three-dimensional scatter distribution.

The method can be performed by applying standard reconstruction methods and image processing techniques. The method in accordance with the invention can be used in all imaging systems which consist of an X-ray source, three gratings, a sample holder platform and a detector. To perform scanning of the sample by means of X-rays, the sample must be rotated about a fixed rotary axis in the radiation field. This can be achieved by rotation of the sample holder as such or by rotation of the sample holder on a rotatable sample holder platform.

This creates an efficient possibility for expanding the use of industrial X-ray CT systems and for using the XTT method very widely.

Grating-based X-ray phase contrast imaging (GBI) methods represent interferometric techniques. Coming closest to conventional attenuation imaging, these techniques provide two additional contrast modes which are jointly recorded and attained. They consist of differential phase contrast and dark-field contrast. The widely used X-ray attenuation imaging is by contrast based substantially only on the intensity reduction of X-rays during passage through a sample.

The additional dark-field contrast can be interpreted as X-ray scatter information. This results mainly from structures on a length scale far below the spatial resolution of the actual imaging system. Due to the capability of combining scatter information with the spatial resolution in a single image, dark-field imaging is of special interest when investigating microscopic changes in large objects.

Like conventional X-ray imaging, grating-based X-ray phase contrast imaging methods too are thus not restricted to the field of radiography. Instead, computer tomography (CT) methods can be used both in connection with phase contrast signals and in connection with dark-field signals.

A grating-based interferometer for use in X-ray phase contrast imaging methods can be constructed from grating structures with a well-defined orientation. This leads to a grating-based interferometer of this type being sensitive only in respect of phase gradients and scatter information which are linked to a direction perpendicular to the grating lines of the grating forming the basis. The per se anisotropic sensitivity of a grating-based interferometer can be used to characterize the anisotropic dark-field signal originating from the microscopic scatter structures.

This is possible in two-dimensional and three-dimensional manner.

In the three-dimensional case, a complete reconstruction of the anisotropic scatter distribution can only be achieved using complex reconstruction methods. Since the three-dimensional scatter distribution is reconstructed for each voxel, an oriented dark-field tomography in this connection is also referred to as X-ray tensor tomography.

The possibility of testing structural information on a scale which is several orders of magnitude smaller than the scale of the tested object is unique for dark-field imaging.

Possible applications comprise, for example, characterization of fiber-reinforced materials, for example glass fiber-reinforced polymers or carbon compound materials.

FIG. 1 shows the CT structure proposed in accordance with the invention in the form of an X-ray CT device 1 in accordance with the invention for implementing the dark-field tensor tomography method in accordance with the invention with three gratings 31, 32, 33 aligned horizontally and to one another of the grating arrangement 30 forming the basis and with the sample holder 10 designed in accordance with the invention as core components.

This arrangement designed in accordance with the invention is based substantially on a so-called Talbot-Lau X-ray grating-based interferometer. The generated dark-field signals are closely linked to small-angle X-ray scattering (SAXS). This is usually described and tested in the reciprocal space.

To ensure a correct scatter-based tomography, the recorded signal must be invariant during rotation of the sample 60 to be tested. It can be shown that scatter parallel to the rotation axis 81 of the sample 60 can always be regarded as rotation-invariant.

The gratings 31, 32, 33 used for recording dark-field signals permit a restriction of the scatter to the direction perpendicular to the grating lines of the grating elements 31, 32, 33. The result of these correlations is that for a recording of rotation-invariant scatter components, i.e. of scatter components parallel to the rotation axis 81, the grating lines or rods must be perpendicularly aligned to the rotation axis 81 of the sample 60.

Since the rotation axis 81 is in non-medicinal applications usually aligned perpendicularly, i.e. parallel to the z-direction, as shown in FIG. 1, the result is an alignment of the grating arrangement 30 with the grating lines of the grating elements 31, 32, 33 in the horizontal direction, i.e. in this case parallel to the y-direction.

With the horizontal grating orientation, the scatter orientation parallel to the rotation axis 81 can be correctly recorded and reconstructed. A complete image of the voxel-wise and three-dimensional scatter distribution can only be obtained using multiple rotation axes and therefore from measured data recorded for multiple scatter orientations. This is achieved in a similar manner to X-ray tensor tomography, in which different scatter components are simultaneously reconstructed from projections that were recorded with different rotation axes.

It is difficult to record images from all directions without parts of the sample 60 being concealed by the sample holder during imaging and thus made inaccessible for certain projections. This is however essential and of crucial importance for a reconstruction of several and/or different scatter components.

The present invention addresses the crux of this problem and presents a solution.

A key aspect of the solution in accordance with the invention is that to base the device 1 for implementation of a method for registration-based dark-field tensor tomography and hence the method for registration-based dark-field tensor tomography itself on a sample holder 10 and its use, the holder being based on the fundamental principle of arranging the sample 60 to be measured fixed in a sample holder body 11 forming the basis of the holder—e.g. a hollow body 18 or a frame structure 19—and then to attach the hollow body 18 or frame structure 19 on which the sample holder 10 is based to the actual rotation axis 81 and rotate it in accordance with the method for registration-based dark-field tensor tomography.

Here, the hollow body 18 or the frame structure 19 forming the basis of the sample holder 10 and the fastening means 71 of the sample 60 in the interior 12 of the hollow body 11 are for example transparent or substantially transparent for the X-rays used.

The hollow body 18 forming the basis of the sample holder 10 can be a hollow sphere, a ring, a combination of several rings, a cube, a cuboid or any other hollow shape in the form of a polyhedron, for example also a cuboctahedron. These bodies can be designed with flat-material components or as wire models, grating models or frame models with materials transparent or substantially transparent for the radiation used.

The sample holder body 11 forming the basis of the sample holder 10 can in this way be freely positioned and fastened on the rotation axis 81, in particular on the tip of a shaft defining the axis 81.

Absorption images of the sample 60 in the interior of the hollow body 18 or frame structure 19 of the sample holder 10—hereinafter also referred to as sample holder hollow body 11—are shown in connection with FIGS. 2 to 4, to illustrate the basic structural idea of the present invention, with the arrow symbol 17 indicating different orientations of the sample holder hollow body 11 relative to the rotation axis 81 and parallel to the z-direction.

The tomographic rotation axis 81 parallel to the z-direction is identical for all three orientations of the sample holder hollow body 11 in FIGS. 2 to 4, which are indicated there by the arrow symbol as an orientation mark 17 on the sample holder hollow body 11. The sample holder hollow body 11, shown spherical there, allows the positioning of any axis through the sample 60 to be tested parallel to the rotation axis 81 and hence testing of this scatter orientation determined thereby.

It is not of particular importance here to measure directions exactly orthogonal to one another. A subsequent registration step, for example in the form of image processing-based registration of the recorded image data, using the simultaneously recorded absorption data, is used for alignment of the different sample volumes recorded. Since the individual absorption and dark-field volumes are intrinsically perfectly registered or registerable, different dark-field volumes can in this way be combined with one another in order to obtain a voxel-wise three-dimensional scatter distribution equivalent to an XTT distribution.

The proposed structure in accordance with the invention of the X-ray CT device 1 for implementing a registration-based dark-field tensor tomography and the corresponding method offer a range of possible applications, in particular in the industrial field too.

Industrial CT scanning can be widely used in the field of non-destructive testing.

The present invention can also be used directly in already existing grating-based interferometer CT systems or in combination with a grating-based interferometer to upgrade a conventional CT scanner.

The sample holder proposed in accordance with the invention can be manufactured in simple manner, and in any required size. A simple and straightforward implementation and the possibility of upgrading existing systems without the need to use highly specialized hardware or software makes the described method accessible for wider application.

The concept in accordance with the invention can therefore lead to considerable improvements in the field of industrial goods characterization and quality control.

The following explanations describe the aforementioned additional properties of the present invention in detail:

A correct tomography result using conventional equipment and methods is only possible from a scatter process parallel to a sample rotation axis forming the basis.

Accordingly, in a grating arrangement 30 the grating lines should be positioned perpendicularly to the rotation axis 81 of the sample 60 forming the basis. This permits testing of a scatter direction by means of a tomography scan.

The following shows a possible sequence for a working method as an example:

(1) Using horizontally aligned gratings 31, 32, 33 of a grating arrangement 30, a scatter direction parallel to a rotation axis 16 of a sample 60 forming the basis can be tested by a computer tomography scan.

(2) The sample 60 is positioned inside a sample holder hollow body 11, for example in the form of a spherical hollow body 18 or a hollow sphere, with the sample holder hollow body 11 being attached to the rotation axis 16 forming the basis. This permits repeated and multiple computer tomography scans with tested scatter processes, each along a different axis relative to the reference system of the sample 60.

(3) The actually tested scatter orientation is not relevant here, provided a sufficient number of orientations is tested, for example three orientations—preferably perpendicular or substantially perpendicular to one another—or more than three orientations, in which the perpendicular alignment to one another is no longer essential.

(4) Each individual computer tomography scan can be performed regardless of all other scans.

(5) The reconstruction can be performed by algorithms of the filtered back-projection. It is only essential here to obtain the three-dimensional data set for each of the scans.

(6) Each of the CT volumes obtained in this way corresponds to another scatter orientation. Due to the sample rotation, they do not overlap and a subsequent processing step is necessary for registration of the data sets in order to obtain a mutual alignment and/or superimposition.

(7) Due to the nature of grating-based interferometry, an X-ray absorption tomography according to the data sets can result, which can be recorded and measured parallel to the data sets for the scatter. Each pair of scatter and absorption CT data sets is intrinsically perfectly registered or aligned to one another.

(8) Finally, post-processing is necessary to take account of any rotation misadjustment between the individual volumes. From the circumstances in section (7), it is known that the attenuation data are already available. Attenuation is an isotropic process. This means that all attenuation volumes match—except for rotation. The rotations are identical to those of the scatter volumes. However, the scatter volumes change with rotation, while the attenuation data are retained under rotation.

(9) Due to the circumstances set out in section (8), all procedures can be applied for registering volume data sets, with the attenuation data sets being used to calculate the rotational shifts and apply these shifts to the scatter data sets.

(10) Registration can be performed as follows: All N attenuation-based volumes and N scatter-based volumes are loaded. The first volume requires no additional treatment. This is for example defined in connection with a scatter in the z-direction. This results in a rotation and a translation, which are necessary for a perfect alignment or match. The rotation and the translation can also or additionally be obtained from registrations to absorption data and then applied to the dark-field data. Rotation and translation are used in two ways: first the scatter volume is rotated and translated or shifted so that it spatially matches the first scatter volume. Furthermore, the scatter direction of the recorded scatter volume is regarded as a direction along the z-direction before rotation. The same rotation—applied to the z-vector—supplies the orientation of the scatter recorded with reference to the second volume, namely in the reference system of the first volumes. This process is repeated for all N volumes.

(11) As soon as this process has been completed, scatter volumes perfectly registered and aligned with one another are available. Also known is the exact direction of the recorded scatter signals through each volume. These volumes can be merged with or connected to one another to form a common data set, with each voxel having not just one value, for example a value for attenuation, but multiple values. Each of the values corresponds to one of the recorded axes from section (2).

Due to the process in accordance with the invention, the following advantages, among others, result when compared with conventional methods:

(A) Conventional arrangements permitting rotations with multiple axes and exact sample positioning are bulky and cost-intensive. By contrast, only minor additional sample preparation is needed in accordance with the invention. This consists only of placing the sample 60 inside the sample holder hollow body 11 forming the basis and fastening it there. This results in a simple possibility for orientation between individual scanning operations or scans within the registration-based dark-field tensor tomography method in accordance with the invention.

(B) A direct reconstruction of the scatter orientations in a sample 60 was previously only possible with highly specialized iterative reconstruction methods. In accordance with the invention, this is replaced by a transition to several individual reconstructions, where each individual reconstruction can be implemented using particularly simple and well-understood procedures and algorithms, for example the so-called filtered back-projection. No additional developments are necessary for an actual reconstruction.

(C) For volume registration, different procedures can be used. The only additional expense is to transfer or transmit the reconstruction results to the volume registration methods, for example the corresponding software components. This also permits automatic handling of the registration step.

(D) Overall, the resulting advantages are
  (i) a marginal additional effort for sample preparation,
  (ii) the use of very simple and available reconstruction methods,
  (iii) the possibility of using widespread registration methods and software.

By contrast, the conventional procedure, i.e. without using the sample holder 10 designed in accordance with the invention, requires the use of cost-intensive measures for high-precision positioning of the sample and of special reconstruction software.

LIST OF REFERENCE NUMERALS

1 Device, X-ray CT device
10 Holder, sample holder, object holder
11 Sample holder hollow body, sample holder body
11-1 Inner side, inner face
11-2 Outer side, outer face
12 Interior of sample holder body 11
13 Edge element, edge area
14 Surface element, surface area
15 Support
17 Orientation mark
18 Hollow body
19 Frame structure
20 Radiation source, X-ray source
21 Radiation, X-rays
22 Radiation, X-rays
23 Radiation, X-rays
24 Radiation, X-rays
25 Radiation, X-rays
26 Ray path
30 Grating arrangement
31 Grating element, grating
32 Grating element, grating
33 Grating element, grating
40 Detector arrangement
50 Control unit
51 Control and recording line
52 Control and recording line
53 Control and recording line
54 Control and recording line
55 Control and recording line
56 Control and recording line
57 Bus
60 Testing object, sample
61 Sample axis, symmetrical axis
70 Fastening arrangement
71 Fastening means
80 Rotation device
81 Rotation axis/rotary axis of rotation device 80/of sample holder 10
82 Base
83 Drive device
x Spatial direction
y Spatial direction
z Spatial direction

What is claimed is:
1. An X-ray CT method for testing a sample (60) by means of X-rays, the method comprising:

consecutively scanning a sample (60) by means of X-rays in at least two fixed orientations differing from one another while rotating about a fixed rotation axis (81), recording a plurality of scatter data sets in every orientation of the sample (60) on the basis of dark-field signals, and matching the scatter data sets for different orientations to one another by registration and combining into a common scatter data set reflecting a possible angular dependence of scattering due to the sample (60), wherein the rotation axis (81) for an orientation of the sample (60) is aligned perpendicular or substantially perpendicular to grating lines of identically oriented first, second and third grating elements (31, 32, 33) of a grating arrangement (30) that are disposed between a radiation source (20) and a detector arrangement (40) in a ray path (26).

2. The method in accordance with claim 1, wherein the orientation of the sample (60) is defined by an orientation of the fixed rotation axis (81) of the sample (60).

3. The method in accordance with claim 1, wherein the sample (60) is scanned for at least three different orientations of the rotation axis (81) in order to generate the plurality of scatter data sets, the at least three different orientations of the rotation axis (81) being perpendicular or substantially perpendicular to one another in pairs.

4. The method in accordance with claim 1, wherein for generating the plurality of scatter data sets, the sample (60) is scanned for four different orientations of the rotation axis (81).

5. The method in accordance with claim 1, wherein for mounting the sample (60) and for setting the orientation of the rotation axis (81), a sample holder (10) is used which has a sample holder body (11) designed to receive the sample (60) in its interior (12) indirectly or directly on an inner side (11-1) of the sample holder body (11), detachably, and connected or connectable non-rotatably to the sample holder body (11).

\* \* \* \* \*